(12) United States Patent
Prost et al.

(10) Patent No.: US 12,135,060 B2
(45) Date of Patent: Nov. 5, 2024

(54) MEMBER FOR GUIDING A MOBILE ELEMENT IN OSCILLATION OR ROTATION

(71) Applicant: HYDROMECANIQUE ET FROTTEMENT, Andrezieux-Boutheon (FR)

(72) Inventors: Fabrice Prost, Saint-Etienne (FR); Pierrick Pavallier, Perreux (FR)

(73) Assignee: HYDROMECANIQUE ET FROTTEMENT, Andrezieux-Boutheon (FR)

( * ) Notice: Subject to any disclaimer, the term of this patent is extended or adjusted under 35 U.S.C. 154(b) by 0 days.

(21) Appl. No.: 17/611,267

(22) PCT Filed: May 15, 2020

(86) PCT No.: PCT/FR2020/050818
§ 371 (c)(1),
(2) Date: Nov. 15, 2021

(87) PCT Pub. No.: WO2020/234533
PCT Pub. Date: Nov. 26, 2020

(65) Prior Publication Data
US 2022/0260115 A1    Aug. 18, 2022

(30) Foreign Application Priority Data
May 22, 2019   (FR) ...................................... 1905386

(51) Int. Cl.
*F16C 33/12*   (2006.01)
*F16C 33/10*   (2006.01)

(52) U.S. Cl.
CPC ............ *F16C 33/12* (2013.01); *F16C 33/102* (2013.01); *F16C 2202/04* (2013.01); *F16C 2223/14* (2013.01); *F16C 2223/30* (2013.01)

(58) Field of Classification Search
CPC ...... F16C 17/02; F16C 33/043; F16C 33/102; F16C 33/103; F16C 33/1065; F16C 33/12
See application file for complete search history.

(56) References Cited

U.S. PATENT DOCUMENTS 5,352,044 A * 10/1994 Jordens ................. F16C 33/102
                                                            384/295
9,222,511 B2 * 12/2015 Lee ........................ F16C 33/103
(Continued)

FOREIGN PATENT DOCUMENTS

AT         412498      *  3/2005
EP      2375091 A2       10/2011
(Continued)

OTHER PUBLICATIONS

Translation of WO2018181285 obtained Feb. 22, 2023.*
Translation of the claims of AT412498 obtained Jan. 6, 2024.*

*Primary Examiner* — James Pilkington
(74) *Attorney, Agent, or Firm* — FORGE IP, PLLC

(57) ABSTRACT

A member for guiding an element mobile in oscillation or rotation is presented. The member has a body made of a hardened metallic material, provided with a bore for assembling the mobile element, having cavities that are distributed discontinuously in the bore and capable of acting as grease reserves, and having optional grease supply. In the bore are defined a bearing surface outside of the cavities and the grease supply, and a non-bearing surface in the cavities and the grease supply. The bore includes at least one zone with: cavities having a depth of between 2 and 5 mm, and a quantity of grease in the cavities per bearing surface of between 0.05 and 0.3 g/cm². A mechanical system having such a member and a method for manufacturing such a member is also contemplated.

10 Claims, 3 Drawing Sheets

(56) References Cited

U.S. PATENT DOCUMENTS

| | | | |
|---|---|---|---|
| 9,618,039 B2* | 4/2017 | Arnold | ................ F16C 33/1065 |
| 2008/0159672 A1 | 7/2008 | Barlerin et al. | |
| 2011/0235955 A1 | 9/2011 | Lee et al. | |

FOREIGN PATENT DOCUMENTS

| | | | |
|---|---|---|---|
| FR | 2882406 A1 | | 8/2006 |
| GB | 2446245 A | | 8/2008 |
| JP | H0396715 A | | 4/1991 |
| JP | 2004084815 A | | 3/2004 |
| JP | 2016165803 A | | 9/2016 |
| JP | 2018044611 A | | 3/2018 |
| WO | WO2006111661 A1 | | 10/2006 |
| WO | WO2014091123 | | 6/2014 |
| WO | WO2014091124 | | 6/2014 |
| WO | WO2018181285 | * | 10/2018 |

\* cited by examiner

MEMBER FOR GUIDING A MOBILE ELEMENT IN OSCILLATION OR ROTATION

TECHNICAL FIELD

The present invention relates to a member for guiding a mobile element in oscillation or rotation. The invention also relates to a mechanical system comprising such a member, and a method for manufacturing such a member.

The field of the invention is that of guiding members ensuring a guiding function in oscillation or in rotation, in continuous or reciprocating movement.

PRIOR ART

Conventionally, such a guiding member is constituted by a ring, designed for assembling with the ability to articulate an element such as an axis or a shaft.

In practice, such mechanical systems are subjected to high stresses in service: high pressure, corrosion, abrasion, impacts. To improve their service life, a lubrication is provided between the ring and the axis.

The ring can be provided with arrangements acting as a grease reserve, as described, for example, in documents WO 2014091123 and WO 2014091124 in the name of the Applicant.

When the mechanical system is in use, the grease gradually leaves the arrangements to lubricate the friction interface between the ring and the axis. Thus, the arrangements make it optional to carry out lubrication only during assembly, or else with very large lubrication time intervals.

Bronze, composite and polymer rings have the advantage of being able to adapt to the geometry of the axis when they are subjected to high loads, and thus decrease normal pressures. The decrease in the PV factor (Pressure×Speed) thus leads to a decrease in wear. However, their low surface hardness results in a low resistance to abrasive wear.

Thus, for the rings subjected to high loads and to high abrasion, it is customary to use steels with high mechanical properties (tensile yield strength Re>800 MPa) and high hardnesses.

These steels are heat-treated and have a bainitic or martensitic structure. However, because of their high mechanical properties, these rings cannot accommodate the deflections of the axis, which leads to very high localised PV factors, and consequently to wear and then to seizing.

The Applicant has a great deal of expertise in the field of guiding members, and continuously seeks to improve existing systems.

DESCRIPTION OF THE INVENTION

The aim of the present invention is to propose an improved guiding member, having excellent resistance to wear and to seizing, and a long service life.

To this end, the invention aims for a member for guiding a mobile element in oscillation or rotation, comprising a body made of a hardened metallic material (metallic material with hardening treatment), provided with a bore for assembling the mobile element, comprising cavities that are distributed discontinuously in the bore and capable of acting as a grease reserve, and comprising optional grease supply means; in the bore being defined a bearing surface outside the cavities and the supply means, and a non-bearing surface in the cavities and the supply means; characterised in that the bore comprises at least one zone with cavities having a depth of between 2 and 5 mm, and a quantity of grease in the cavities per bearing surface of between 0.05 and 0.3 g/cm$^2$.

Thus, the invention allows to propose a guiding member that is resistant, efficient and simple to implement. This member is particularly well suited to mechanical systems operating under heavy loads and subjected to impacts in an abrasive environment, such as the articulations equipping public works, mining, agricultural or industrial machinery (for example, the steel sector).

According to other advantageous characteristics of the invention, taken individually or in combination:

The amount of grease per bearing surface is of between 0.05 and 0.2 g/cm$^2$.

The depth of the cavities is of between 3 and 5 mm, preferably equal to 4 mm.

The body has a radial thickness of greater than 5 mm, preferably greater than 6 mm.

The metallic material of the body has an yield strength Re of between 200 and 600 MPa.

The metallic material of the body is steel.

The grease supply means comprise at least one through hole between the outer surface and the bore of the body.

The grease supply means comprise at least one annular groove formed in the bore.

The grease supply means comprise at least one annular groove formed on the outer surface of the body.

The body has no groove on its outer surface, in particular when an annular groove is formed in the bore.

The grease has a density (ISO2811) of preferably between 0.85 and 1.05 g/cm$^3$, for example equal to 0.9 g/cm$^3$.

By way of non-limiting examples, the grease may be chosen from the references "SNR Lub EP2", "BP energrease LS EP2" and "Tutela grease MRM2".

The bore is preferably cylindrical.

The bore comprises a surface coating.

The surface coating is applied to the bearing surface and in the cavities, after formation of the cavities.

The surface coating is applied to the bearing surface before the cavities are formed.

The treatment or coating has physical properties different from the basic metallic material of the body.

The treatment or coating is multilayer or single-layer.

The coating is made by physical vapour deposition (PVD).

The coating is made by chemical vapour deposition (CVD).

The coating is made by hot spraying.

The coating is made by cold spraying.

The coating is sprayed in powder form.

The coating is sprayed in the form of drops.

The coating is made by High Velocity Oxy-Fuel (HVOF).

The coating is made by laser cladding.

The coating is anti-seizing.

The coating comprises an outer layer of amorphous carbon of the DLC (diamond-like carbon) type, in particular with a thickness of between 1 to 5 μm, for example 3 μm.

The coating comprises an outer layer of self-lubricating composite, in particular resin- and/or woven or non-woven reinforcement-based, comprising, for example, fillers of the PTFE, MoS2 or graphite type.

The coating comprises a polymer varnish.

The treatment is nitriding. Preferably, the bore has a combination layer (white layer) having a thickness in particular of between 5 and 50 μm, for example 20 μm.

The treatment is a cementation. Preferably, the cementation is made on a thickness of between 0.5 and 4 mm, for example 2 mm.

The treatment is a solid-soaking.

The treatment is an induction-soaking, preferably high-frequency.

The bore has a superficial layer treated against the seizing over a diffusion depth less than or equal to 0.6mm, the superficial layer having a hardness greater than or equal to 500 Hv1 over a depth between 5 and 50 μm.

The zone covers the whole bore, 360 degrees around the longitudinal axis of the body.

The zone extends into the bore over an angular sector of at least 120 degrees around the longitudinal axis of the body.

Two zones extend into the bore each over an angular sector of at least 120 degrees around the longitudinal axis of the body. Preferably, the two zones are located on either side of the axis.

The zone can have cavities of several different types, or of one type only.

The cavities have a circular cross-section.

The cavities have a honeycomb cross-section.

The cavities each have a greater length or a diameter of between 2 and 15 mm, for example 6 mm.

The cavities have a surface density of between 5 and 65%, this surface density being defined as the ratio of the non-bearing surface to the bearing surface, in said zone including the cavities.

The cavities do not open out laterally on the sides of the body.

The invention also aims for a mechanical system, comprising a guiding member such as mentioned above, and an element mobile in oscillation or rotation in this guiding member.

The invention also aims for a method for producing a member for guiding a mobile element in oscillation or rotation, characterised in that the method comprises the following successive steps:

a) manufacturing a body made of a metallic material, provided with a bore for assembling the mobile element, comprising cavities that are distributed discontinuously in the bore and capable of acting as a grease reserve, and comprising optional grease supply means; in the bore being defined a bearing surface outside of the cavities and supply means, and a non-bearing surface in the cavities and supply means; the bore comprising at least one zone with cavities having a depth of between 2 and 5 mm;

b) performing a hardening treatment on the bore, at least in said zone; and c) applying grease in the bore, at least in said zone, with a quantity of grease in the cavities per bearing surface of between 0.05 and 0.3 g/cm² in said zone.

According to an embodiment of the manufacturing method, in the step of applying the grease in the bore, the quantity of grease in the cavities per bearing surface is between 0.05 and 0.2 g/cm².

BRIEF DESCRIPTION OF THE DRAWINGS

The invention will be better understood upon reading the following description which is given only by way of non-limiting example and made with reference to the appended drawings, wherein.

DETAILED DESCRIPTION OF THE INVENTION

Figure 1:
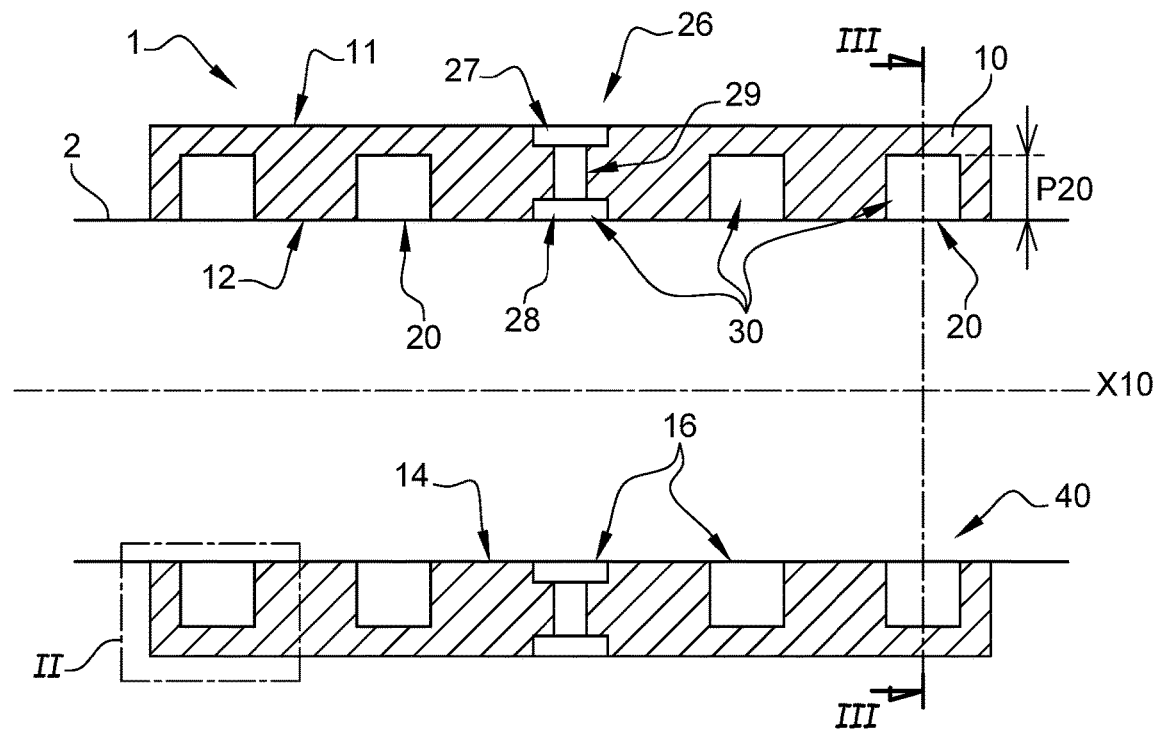
FIG. 1 is an axial cross-section of a mechanical system according to the invention, comprising a ring and a shaft housed in the ring.
Figure 2:
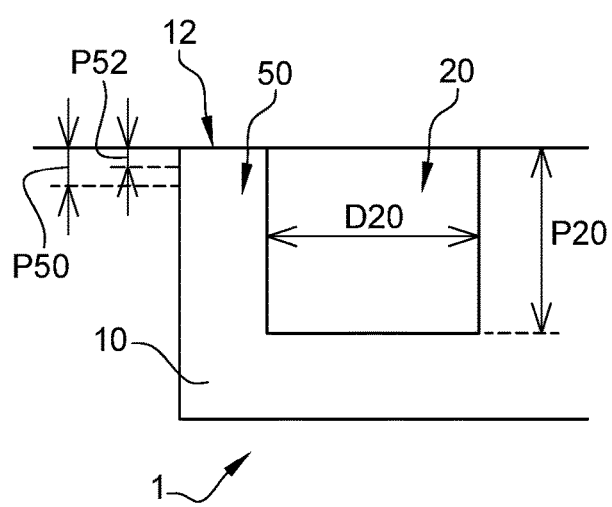
FIG. 2 is a larger scale view of detail II in FIG. 1.
Figure 3:
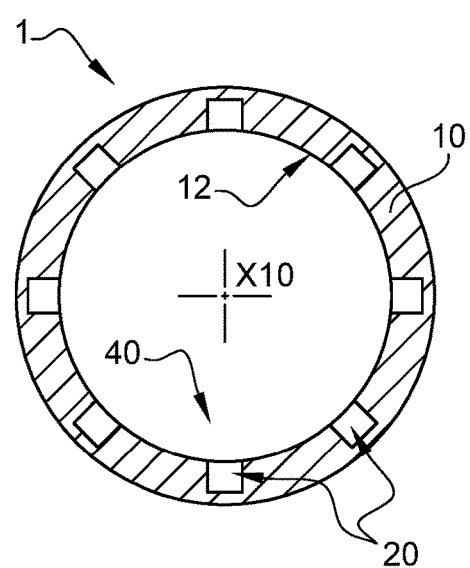
FIG. 3 is a radial cross-section of the ring along the line III-III in FIG. 1.

FIGS. 1 to 3 show a mechanical system according to the invention, comprising a guiding ring (1) also according to the invention, and a shaft (2) mobile in oscillation or rotation in the ring (1).

The ring (1) comprises a tubular body (10) centred on a longitudinal axis (X10). The body (10) has an outer cylindrical surface (11) and an inner cylindrical surface forming a bore (12) for receiving the shaft (2). The body (10) is made of a metallic material receiving a hardening treatment, for example nitriding, cementation or soaking. Preferably, the body (10) is made of steel having a yield strength Re of between 200 and 600 MPa.

The body (10) comprises cavities (20) that are distributed in the bore (12) and capable of acting as a grease reserve (30). The cavities (20) are discontinuously distributed in the bore (12), i.e. they do not communicate with each other. Preferably, the cavities (20) are regularly distributed in the bore (12), around and/or along the axis (X10).

The cavities (20) can be of any shape. For example, the cavities (20) can have a circular radial cross-section, with a diameter (D20), and a rectangular axial cross-section, with a depth (P20). In practice, the depth (P20) is measured at the bottom of the cavity (20), at the point farthest from the surface of the bore (12).

The body (10) also comprises means (26) for supplying grease (30) to the bore (12). For example, the supply means (26) comprise an annular groove (27) formed on the outer surface (11), an annular groove (28) formed in the bore (12), and at least one orifice (29) passing through the body (10) between the grooves (27, 28). The annular grooves (27, 28) are formed around the axis (X10). Preferably, the supply means (26) comprise several orifices (29) distributed around the axis (X10), of which there are two, three, four or more orifices (29). The means (26) and more specifically the groove (28) are not connected to the cavities (20).

Alternatively, the supply means (26) can have no outer groove (27). Indeed, tests have shown that the inner groove (28) is sufficient to ensure the supply of grease (30) into the bore (12).

In the bore (12), a bearing surface (14) is defined outside the cavities (20) and the supply means (26), and a non-bearing surface (16) is defined as the openings of the cavities (20) and the supply means (26).

According to the invention, the bore (12) comprises at least one zone (40) with:

a depth (P20) of cavities (20) of between 2 and 5 mm, and a ratio of the amount of grease (30) in the cavities (20) divided by the bearing surface (14) of between 0.05 and 0.2 g/cm².

The grease (30) contained in the supply means (26) is not taken into account in the calculation of the grease (30)/bearing surface (14) ratio.

Tests carried out by the Applicant have shown that, in the case of an articulation operating in oscillation or in rotation, the grease (30) comprised in the inner groove (28) does not have an effect on the lubrication of the bore (12) since this groove (28) is not connected to the cavities (20). Furthermore, this groove (28) contributes to increasing the contact pressure between the shaft (2) and the ring (1) by reducing the bearing surface (14).

These tests have been carried out under the following conditions:

Rings (1) of inner diameter 80 mm/outside diameter 95 mm/length 60 mm

Pressure=50 MPa

PV: 0.21 MPa·m/s

Initial lubrication only.

Comparison between rings (1) with and without inner lubrication groove (28).

The service life of the rings (1) without an inner lubrication groove (28) is twice as long as the rings (1) with an inner lubrication groove (28).

The results obtained are contrary to certain publications of the state of the art, claiming that all the grease (30) contained in a ring (1) is "effective", including the grease (30) contained in the inner and outer grooves (27, 28).

Preferably, the depth (P20) of the cavities (20) in the zone (40) is of between 3 and 5 mm. More preferably, the depth (P20) is equal to 4 mm.

In the example of FIGS. 1 to 3, the zone (40) covers the whole bore (12), 360 degrees around the axis (X10) of the body (10). In other words, the whole bore (12) is provided with cavities (20) having a depth (P20) of between 2 and 5 mm.

Preferably, the bore (12) has a surface layer (50) treated against seizing over a diffusion depth (P50) less than or equal to 0.6 mm, the surface layer (50) having a hardness greater than or equal to 500 Hv1 over a depth (P52) of between 5 and 50 μm.

Two test runs were carried out by varying certain parameters, such as the dimensions of the ring (1), the dimensions of the cavities (20), and the material of the shaft (2).

For the first test run, Table 1 presents the test conditions used for this run, while Tables 2 and 3 present different series of tests and the results obtained.

TABLE 1

| Bench | Large Oscillation Test Bench |
|---|---|
| Law of Motion | Sinusoidal axis oscillation |
| Oscillation amplitude | 90° |
| Grease (type) | Extreme Pressure Grease |
| Lubrication | Initial Only (no supply means (26) provided in the ring (1)) |
| Ring material (1) | Steel (Re < 600 MPa) |
| Shaft material (2) | 16NC6 Cemented Soaked |
| Stop criterion | COF > 0.35 |
| | T° > 100° C. |
| | Wear > 0.5 mm |

TABLE 2

| Test conditions | | Quantity of grease/bearing surface (g/cm²) | Performance: number of cycles completed until seizing | Cavity depth |
|---|---|---|---|---|
| P (MPa) | PV (MPa · m/s) | | | |
| Ring 100 | 0.1 | 0.039 | 15000 | 4 |
| Inner Ø 100 | 0.1 | 0.039 | 20000 | 3 |
| 30 mm 100 | 0.1 | 0.051 | 50000 | 4 |
| Length 100 | 0.1 | 0.1 | 83000 | 3 |
| 20 mm 100 | 0.1 | 0.133 | 92000 | 4 |
| 100 | 0.1 | 0.166 | 97000 | 5 |
| 100 | 0.1 | 0.2 | 95000 | 6 |
| 100 | 0.1 | 0.2 | 120000 | 4 |
| 100 | 0.1 | 0.3 | 90000 | 5.5 |
| 100 | 0.1 | 0.3 | 99000 | 4 |
| 100 | 0.1 | 0.391 | 35000 | 4 |

The results of tests carried out on larger ring dimensions are given in Table 3 below.

TABLE 3

| Test conditions | | Quantity of grease/bearing surface (g/cm²) | Performance: number of cycles completed until seizing | Cavity depth |
|---|---|---|---|---|
| P (MPa) | PV (MPa · m/s) | | | |
| Ring 50 | 0.21 | 0.036 | 70000 | 2 mm |
| Inner Ø 50 | 0.21 | 0.057 | 110000 | 3 mm |
| 80 mm 50 | 0.21 | 0.091 | 164000 | 4 mm |
| Length 50 | 0.21 | 0.144 | 300000 | 4 mm |
| 60 mm | | | | |

For the second test run, Table 4 presents the test conditions used for this run, while Table 5 presents a series of tests and the results obtained.

TABLE 4

| Bench | Large Oscillation Test Bench |
|---|---|
| Law of Motion | Sinusoidal axis oscillation |
| Oscillation amplitude | 90° |
| Grease (type) | Extreme Pressure Grease |
| Lubrication | Initial Only (no supply means (26) provided in the ring (1)) |
| Ring material (1) | Steel (Re < 600 MPa) |
| Shaft material (2) | 42CD4 QT + HF soaking with hard Cr coating (soaked and coated steel) |
| Stop criterion | COF > 0.35 |
| | T° > 100° C. |
| | Wear > 0.5 mm |

TABLE 5

| Test conditions | | Quantity of grease/bearing surface (g/cm²) | Performance: number of cycles completed until seizing | Cavity depth |
|---|---|---|---|---|
| P (MPa) | PV (MPa · m/s) | | | |
| Ring 100 | 0.1 | 0.039 | 27000 | 4 |
| Inner Ø 100 | 0.1 | 0.039 | 39500 | 3 |
| 30 mm 100 | 0.1 | 0.051 | 84000 | 4 |
| Length 100 | 0.1 | 0.133 | 135000 | 4 |
| 20 mm 100 | 0.1 | 0.2 | 144300 | 6 |
| 100 | 0.1 | 0.2 | 180000 | 4 |
| 100 | 0.1 | 0.3 | 140000 | 4 |
| 100 | 0.1 | 0.391 | 55000 | 4 |

According to the results of the two test runs, it is noted that the performances, which correspond to the number of cycles before seizing, are maximum for a quantity of grease per bearing surface of between 0.05 g/cm² and 0.3 g/cm², and most particularly between 0.05 g/cm² and 0.2 g/cm².

Other embodiments of a guiding member (1) according to the invention are shown in FIGS. 4 to 9. Certain constituent elements of the member (1) are comparable to those of the first embodiment described above and, with the aim of simplification, have the same numerical references.

Figure 4:
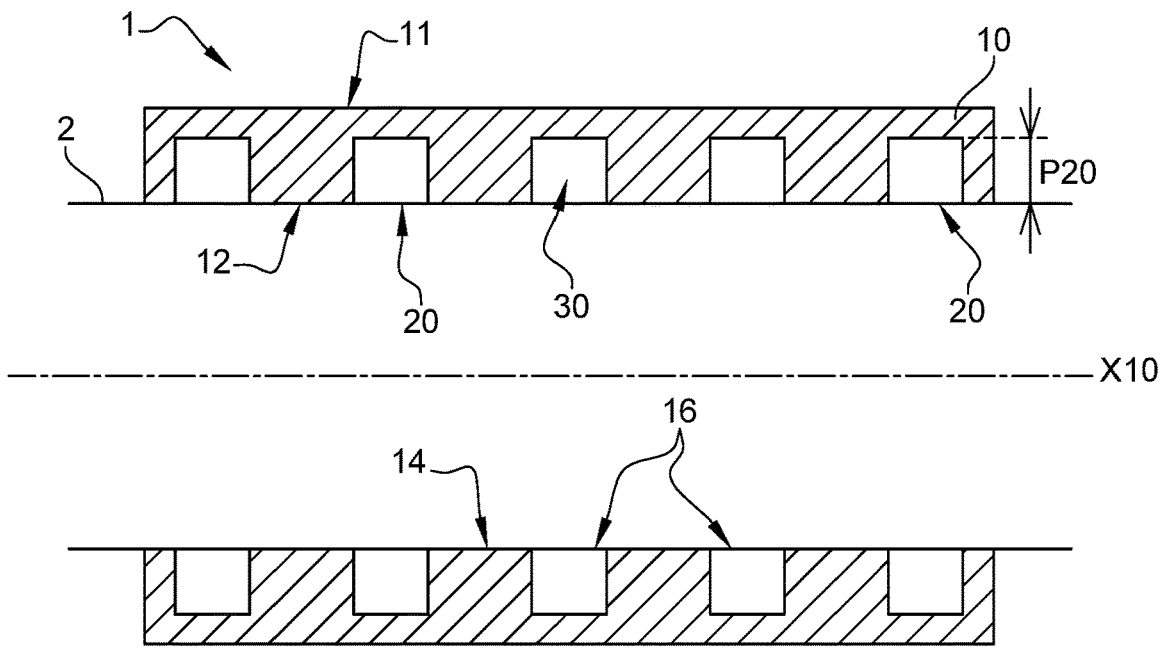
FIG. 4 is a cross-section similar to FIG. 1, showing a ring variant according to the invention, without grease supply means.

FIG. 4 shows a guiding member (1) comprising cavities (20) but with no grease supply means (30). In the bore (12), the bearing surface (14) is defined outside of the cavities (20) and the non-bearing surface (16) is defined in the cavities (20).

Figure 5:
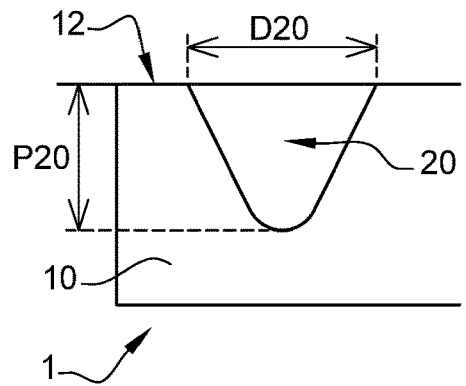
FIG. 5 is a view similar to FIG. 2, showing a cavity variant.

FIG. 5 shows a cavity (20) having a diameter (D20) less than the depth (P20).

Figure 6:
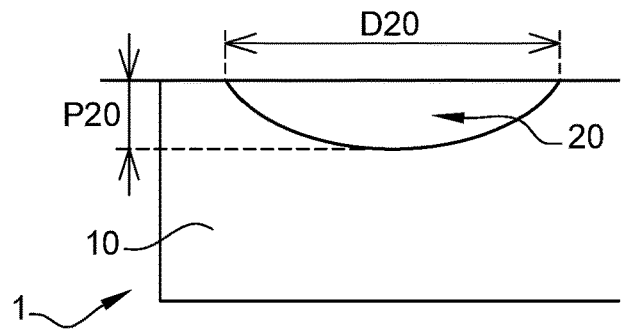
FIG. 6 is a view similar to FIG. 2, showing another cavity variant.

FIG. 6 shows a cavity (20) having a diameter (D20) greater than the depth (P20).

Figure 7:
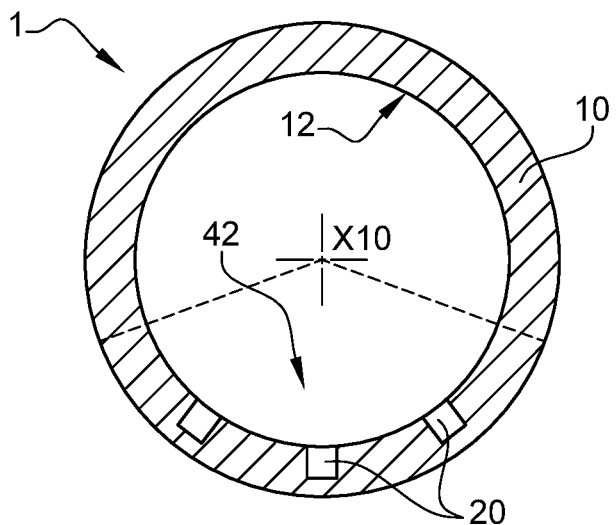
FIG. 7 is a view similar to FIG. 3, showing a bore variant.

FIG. 7 shows a bore (12) comprising a zone (42) extending over an angular sector of 120 degrees around the longitudinal axis (X10). The bore (12) is provided with cavities (20) having a depth (P20) of between 2 and 5 mm only in this zone (42). Outside of the zone (42), the bore (12) has no cavities acting as a grease reserve (30).

Figure 8:
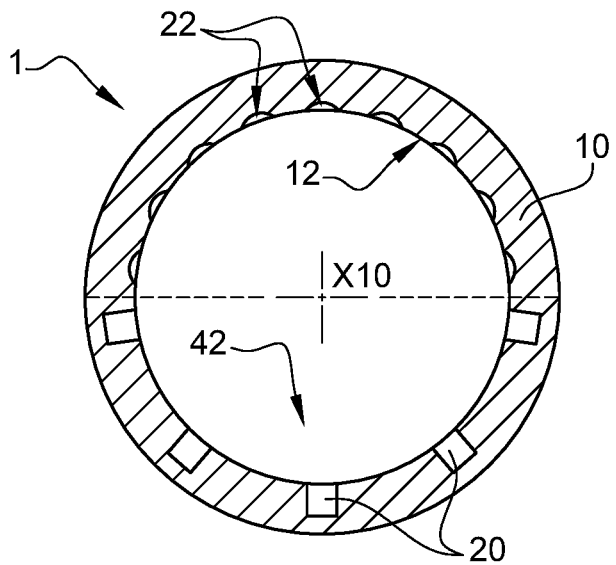
FIG. 8 is a view similar to FIG. 3, showing another bore variant.

FIG. 8 shows a bore (12) comprising a zone (42) extending over an angular sector of 180 degrees around the longitudinal axis (X10). The bore (12) is provided with cavities (20) having a depth (P20) of between 2 and 5 mm only in this zone (42). Outside of the zone (42), the bore (12) is provided with cavities (22) acting as a grease reserve (30) and having a depth of less than 2 mm, for example 1 mm. These cavities (22) are not taken into account for the calculation of the grease (30)/bearing surface (14) ratio in the zone (42).

Figure 9:
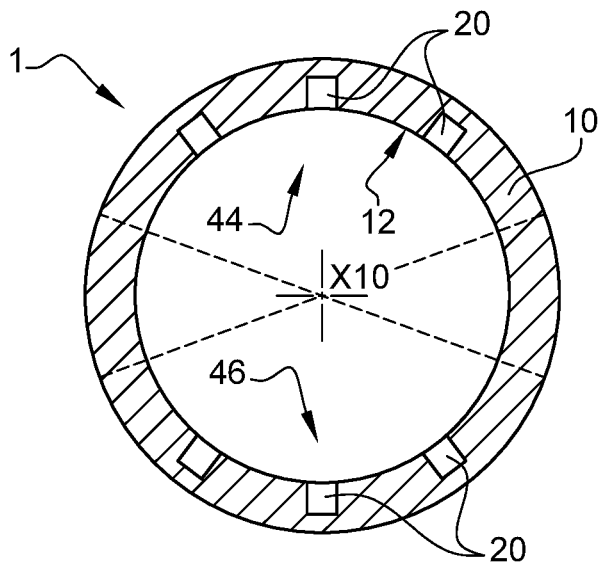
FIG. 9 is a view similar to FIG. 3, showing another bore variant.

FIG. 9 shows a bore (12) comprising two zones (44, 46) each extending over an angular sector of 120 degrees around the longitudinal axis (X10). The zones (44, 46) are located opposite each other on either side of the axis (X10).

Moreover, the guiding member (1) can be shaped differently from FIGS. 1 to 9 without moving away from the scope of the invention defined in the claims. Furthermore, the technical characteristics of the different embodiments and variations mentioned above can be combined in their entirety or only in part. Thus, the guiding member (1) can be adapted in terms of cost, functionalities and performance.

The invention claimed is:

1. A guiding member for guiding a mobile element in oscillation or rotation, comprising a body made of a hardened metallic material, said metallic material being steel, provided with a bore for receiving the mobile element, comprising a grease supply and cavities not connected to the grease supply and distributed discontinuously in the bore and capable of acting as grease reserves, wherein the bore defines:
   a bearing surface outside of the cavities and the grease supply, and
   a non-bearing surface in the cavities and the grease supply,
   wherein the bore has a cylindrical inner surface, and comprises at least one zone with cavities having a depth that is between 2 and 5 mm, and a grease quantity in the cavities not connected to the grease supply per bearing surface of between 0.05 and 0.3 g/cm², wherein said grease quantity per bearing surface of between 0.05 and 0.3 g/cm² is not supplied by the grease supply, and wherein a surface coating is applied to the bearing surface and in the cavities and wherein the bore has a superficial layer treated against seizing over a diffusion depth of less than or equal to 0.6 mm, the superficial layer having a hardness greater than or equal to 500 Hv1 over a depth of between 5 and 50 μm.

2. The guiding member according to claim 1, characterised in that the quantity of grease in the cavities per bearing surface is of between 0.05 and 0.2 g/cm².

3. The guiding member according to claim 1, characterised in that the depth of the cavities in the zone is of between 3 and 5 mm.

4. The guiding member according to claim 1, characterised in that the metallic material of the body has a yield strength Re of between 200 and 600 MPa.

5. The guiding member according to claim 1, characterised in that the zone extends over the whole bore, 360 degrees around a longitudinal axis of the body.

6. The guiding member according to claim 1, characterised in that the zone extends in the bore over an angular sector of at least 120 degrees around a longitudinal axis of the body.

7. The guiding member according to claim 1, characterised in that two zones extend in the bore, each over an angular sector of at least 120 degrees around a longitudinal axis of the body.

8. A mechanical system, comprising a guiding member according to claim 1, and a mobile element in oscillation or rotation in the bore of the guiding member.

9. A method for manufacturing a guiding member for guiding a mobile element in oscillation or rotation, characterised in that the method comprises the following successive steps:
   a) manufacturing a body made of a metallic material, said metallic material being steel provided with a bore for receiving the mobile element, comprising a grease supply and cavities not connected to the grease supply and distributed discontinuously in the bore and capable of acting as grease reserves;
   wherein the bore has a cylindrical inner surface and defines:
   a bearing surface outside of the cavities and the grease supply, and
   a non-bearing surface in the cavities and the grease supply;
   the bore comprising at least one zone with cavities having a depth of between 2 and 5 mm;
   b) performing a hardening treatment on the bore, at least in said zone, the bore having a superficial layer treated against seizing over a diffusion depth of less than or equal to 0.6 mm, the superficial layer having a hardness greater than or equal to 500 Hv1 over a depth of between 5 and 50 μm;
   c) applying a surface coating to the bearing surface and in the cavities, and applying grease in the bore, at least in said zone, with a quantity of grease in the cavities not connected to the grease supply per bearing surface of between 0.05 and 0.3 g/cm² in said zone, wherein said grease quantity per bearing surface of between 0.05 and 0.3 g/cm² does not include the grease contained in the grease supply.

10. The manufacturing method according to claim 9, characterised in that in the step of applying the grease in the bore, the quantity of grease in the cavities per bearing surface is of between 0.05 and 0.2 g/cm².

* * * * *